(No Model.)
C. W. COTTON.
TIRE SETTING MACHINE.
No. 474,162. Patented May 3, 1892.
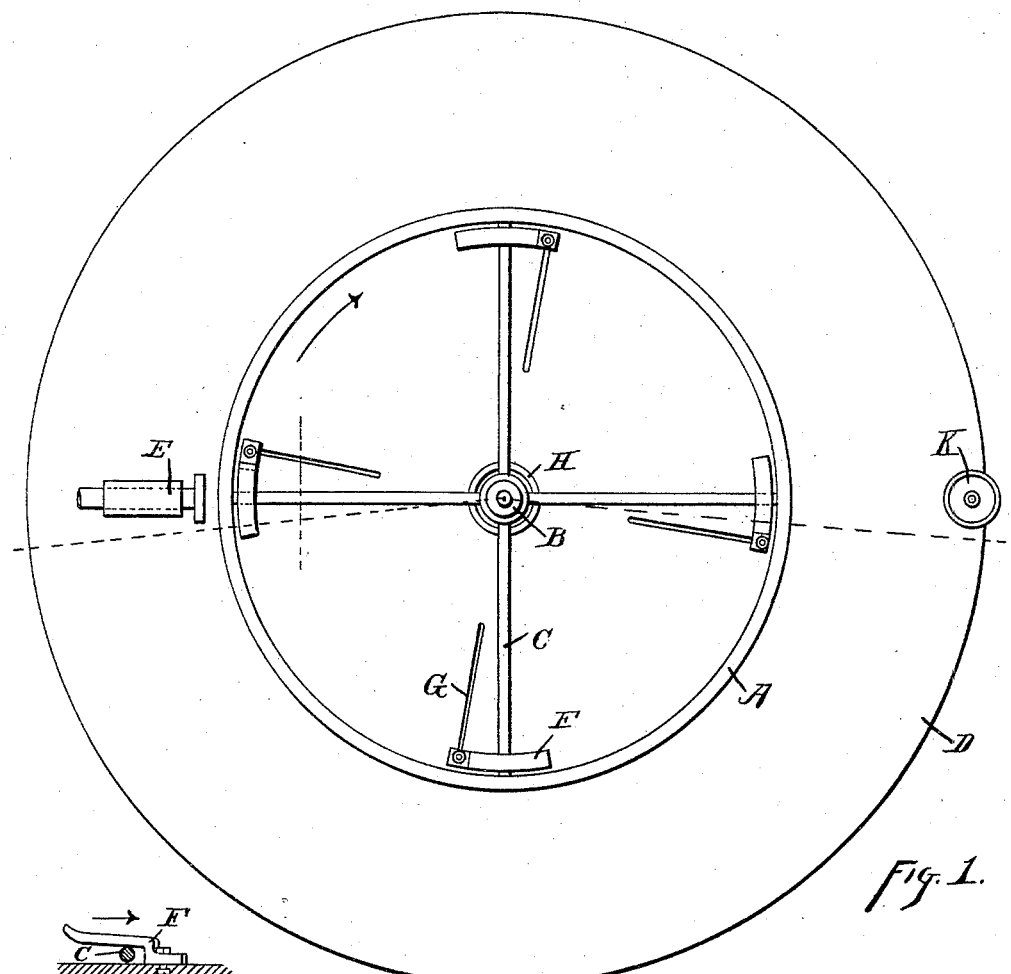
Fig. 1.
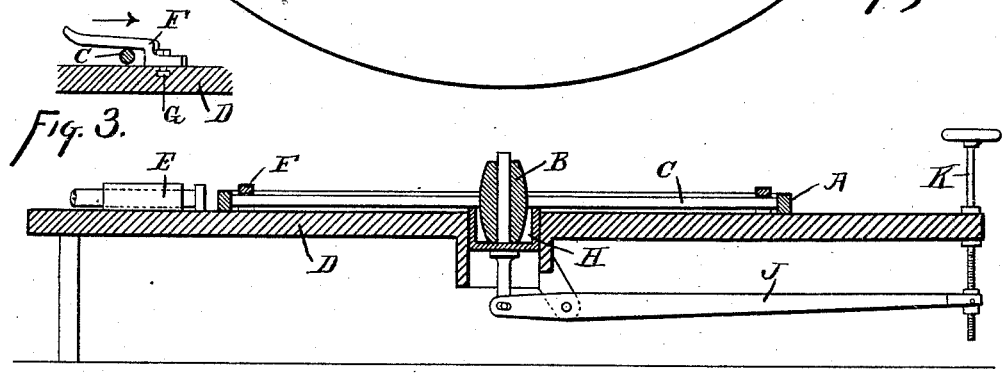
Fig. 3.
Fig. 2.
Witnesses:
P. P. Sheehan
M. S. Belden
Charles Ward Cotton
Inventor
by James W. See
Attorney

UNITED STATES PATENT OFFICE.

CHARLES WARD COTTON, OF INDIANAPOLIS, INDIANA.

TIRE-SETTING MACHINE.

SPECIFICATION forming part of Letters Patent No. 474,162, dated May 3, 1892.

Application filed August 24, 1891. Serial No. 403,541. (No model.)

*To all whom it may concern:*

Be it known that I, CHARLES WARD COTTON, of Indianapolis, Marion county, Indiana, have invented certain new and useful Improvements in Tire-Setting Machines, of which the following is a specification.

This invention pertains to improvements in machines employed for setting the tires upon vehicle-wheels, and has particular reference to the method of supporting the wheel before the tire is applied. The actual application of the tire to the wheel—that is, the compressing of the tire—may be done upon any of the usual systems and by means of any of the usual devices.

My improvements will be readily understood from the following description, taken in connection with the accompanying drawings, in which—

Figure 1 is a plan of a tire-setting machine illustrative of my improvements; Fig. 2, a vertical diametrical section of the same, and Fig. 3 a vertical section of a portion of the same at right angles to one of the wheel-spokes.

In the drawings, A indicates the rim of the wheel on which the tire is to be set; B, the hub thereof; C, the spokes thereof, but four spokes being shown; but there may be any usual number; D, the usual table of the tire-setting machine; E, compressing device to compress the tire upon the wheel, one only being shown, this one being intended merely to typify any of the usual tire-compressing devices employed upon tire-setting machines when compressing devices are employed; F, clamps secured to the table at or near the rim and engaging over the wheel, preferably at the spokes just within the rim, these clamps being illustrated as open-fronted stationary clamps whose under surfaces are inclined so as to approach the table from the throat inwardly; G, slots in the table to permit the clamps to be adjusted to suit different-sized wheels; H, a support mounted at the center of the table for the center of the wheel and movable vertically with reference to the table, this support being adapted to engage either under the hub or under the spokes near the hub, whichever may be desired or provided for; J, a lever fulcrumed under the table and engaging the central support H; and K, a screw mounted in the table and engaging the lever and adapted to serve in moving the central support H vertically, the screw and lever merely exemplifying mechanism applicable to the purpose of adjusting the central support.

Sometimes new wheels are sprung more or less, and sometimes they are sprung into a dish the wrong way. The compression of the tire upon the wheel tends to increase the dish if there is any dish to the wheel, and of course to dish it the wrong way if the wheel be improperly sprung. If the wheel, instead of having some dish at the beginning of the compressing operation, be dead flat, the tendency of the compressing operation is to crush the wheel. All these troubles are obviated by the use of my improvements.

In using my machine the wheel is placed upon the table with that side downward which is to be dished. The rim of the wheel rests upon the table or upon equivalent supports directly beneath the rim, the center being entirely free and unsupported. The wheel is then turned in the direction of the arrow, whereby the spokes are caused to engage under the clamps. The rim of the wheel is thus held firmly down to the table. The central support H is now raised, forcing the center of the wheel upward and giving to it a dish. The amount of dish thus given may be the full amount which it is desired that the wheel shall have, or may be simply an initial dishing, the completion of the dishing being effected as the tire is compressed in place; or as another method of using the machine the central support may be first adjusted at such height as to give whatever dish is desired, either complete dishing or mere initial dishing. The wheel is then placed in the machine, and will of course be then supported only at its center. Then when the wheel is turned as before, the clamps draw the rim down firmly to the table and produce the dishing.

The details of construction of the clamps and of the central support and of the devices for adjusting the central support may be varied without departing from the principle of my invention.

I claim as my invention—

1. In a tire-setting machine, the combination, substantially as set forth, of a table for the support of the wheel at the rim, clamps engaging over the wheel at the rim, a movable support under the center of the wheel, and means for moving said central support vertically with reference to the rim of the wheel.

2. In a tire-setting machine, the combination, substantially as set forth, of a table, an adjustable support thereon for the center of the wheel, and clamps thereon to engage over the wheel at the rim.

CHARLES WARD COTTON.

Witnesses:
 GEO. MCMASTER,
 R. D. DAVIS.